US012190044B2

(12) United States Patent
McClendon et al.

(10) Patent No.: US 12,190,044 B2
(45) Date of Patent: **\*Jan. 7, 2025**

(54) SYSTEM AND METHOD FOR SERVING INTERACTIVE ADVERTISING CONTENT WITH RESPONSIVE ANIMATIONS

(71) Applicant: Yieldmo, Inc., Nashua, NH (US)

(72) Inventors: Terry McClendon, Nashua, NH (US); David Sebag, Nashua, NH (US)

(73) Assignee: Yieldmo, Inc., Nashua, NH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/213,725

(22) Filed: Jun. 23, 2023

(65) Prior Publication Data

US 2023/0334228 A1 Oct. 19, 2023

Related U.S. Application Data

(63) Continuation of application No. 17/561,688, filed on Dec. 23, 2021, now Pat. No. 11,727,197, which is a (Continued)

(51) Int. Cl.
*G06F 40/143* (2020.01)
*G06F 3/04812* (2022.01)
(Continued)

(52) U.S. Cl.
CPC ........ *G06F 40/143* (2020.01); *G06F 3/04812* (2013.01); *G06F 3/0485* (2013.01);
(Continued)

(58) Field of Classification Search
CPC .. G06F 40/143; G06F 3/04812; G06F 3/0485; G06F 3/0488; G06F 3/0482;
(Continued)

(56) References Cited

U.S. PATENT DOCUMENTS 8,418,204 B2 \* 4/2013 Pickelsimer ............ G06F 16/44
715/825
11,727,197 B2 \* 8/2023 McClendon .......... G06F 3/0488
715/720
(Continued)

FOREIGN PATENT DOCUMENTS

AU 2013209298 A1 \* 10/2014 ........... G06F 3/0481
BR PI0922979 B1 \* 6/2022
(Continued)

*Primary Examiner* — Steven P Sax
(74) *Attorney, Agent, or Firm* — Run8 Patent Group, LLC; Peter Miller; Leah Raddatz (57) ABSTRACT

One variation of a method for serving interactive advertisement content includes, at a visual element rendered within a window of a computing device: loading an interactive advertisement, including a digital advertisement and a mask overlaid the digital advertisement, into the visual element, the mask including a base layer and an aperture defining a second opacity less than a first opacity of the base layer; in response to a scroll event that moves the visual element a first position within the window, rendering the interactive advertisement within the visual element; and, in response to a scroll event that moves the visual element to a second position within the window, transforming the mask according to a sequence of transformations at a rate proportional to a scroll rate of the scroll event, the sequence of transformations corresponding to a sequence of vertical positions of the visual element within the window.

20 Claims, 4 Drawing Sheets

Related U.S. Application Data continuation of application No. 17/349,706, filed on Jun. 16, 2021, now Pat. No. 11,244,103, and a continuation-in-part of application No. 17/039,961, filed on Sep. 30, 2020, now Pat. No. 11,604,918, which is a continuation of application No. 15/937,062, filed on Mar. 27, 2018, now Pat. No. 10,832,729, which is a continuation of application No. 15/816,833, filed on Nov. 17, 2017, now Pat. No. 9,966,109, which is a continuation of application No. 15/217,879, filed on Jul. 22, 2016, now Pat. No. 9,852,759, and a continuation-in-part of application No. PCT/US2015/064460, filed on Dec. 8, 2015.

(60) Provisional application No. 63/040,694, filed on Jun. 18, 2020, provisional application No. 62/197,929, filed on Jul. 28, 2015, provisional application No. 62/068,646, filed on Oct. 25, 2014.

(51) Int. Cl.
| | | |
|---|---|---|
| *G06F 3/0485* | (2022.01) | |
| *G06F 3/0488* | (2022.01) | |
| *G06F 40/106* | (2020.01) | |
| *G06Q 30/02* | (2023.01) | |
| *G11B 27/00* | (2006.01) | |
| *G11B 27/031* | (2006.01) | |
| *G11B 27/036* | (2006.01) | |
| *G11B 27/10* | (2006.01) | |
| *G11B 27/11* | (2006.01) | |
| *G11B 27/30* | (2006.01) | |
| *H04N 21/431* | (2011.01) | |
| *H04N 21/433* | (2011.01) | |
| *H04N 21/442* | (2011.01) | |
| *H04N 21/472* | (2011.01) | |
| *H04N 21/482* | (2011.01) | |
| *H04N 21/81* | (2011.01) | |
| *H04L 67/02* | (2022.01) | |

(52) U.S. Cl.
CPC .......... *G06F 3/0488* (2013.01); *G06F 40/106* (2020.01); *G06Q 30/02* (2013.01); *G11B 27/005* (2013.01); *G11B 27/031* (2013.01); *G11B 27/036* (2013.01); *G11B 27/102* (2013.01); *G11B 27/11* (2013.01); *G11B 27/3081* (2013.01); *H04N 21/431* (2013.01); *H04N 21/4333* (2013.01); *H04N 21/44204* (2013.01); *H04N 21/47217* (2013.01); *H04N 21/482* (2013.01); *H04N 21/812* (2013.01); *H04L 67/02* (2013.01)

(58) Field of Classification Search
CPC ... G06F 3/0484; G06F 40/106; H04N 21/431; H04N 21/47217; H04N 21/812; H04N 21/4333; H04N 21/44204; H04N 21/482; G06Q 30/02; G11B 27/031; G11B 27/036; G11B 27/005; G11B 27/102; G11B 27/11; G11B 27/3081; H04L 67/02
See application file for complete search history.

(56) References Cited

U.S. PATENT DOCUMENTS

| | | | | |
|---|---|---|---|---|
| 12,050,863 | B1* | 7/2024 | Doherty | G06F 40/186 |
| 2001/0056370 | A1* | 12/2001 | Tafla | G06F 3/0481 |
| | | | | 705/14.69 |
| 2007/0107010 | A1* | 5/2007 | Jolna | H04N 21/47214 |
| | | | | 348/E7.071 |
| 2008/0010584 | A1* | 1/2008 | Corsetti | G06Q 30/02 |
| | | | | 715/201 |
| 2008/0319852 | A1* | 12/2008 | Gardner | G06Q 30/0241 |
| | | | | 705/14.4 |
| 2009/0106644 | A1* | 4/2009 | Bagg | G06Q 30/02 |
| | | | | 715/235 |
| 2010/0017298 | A1* | 1/2010 | Stukenborg | G06Q 30/02 |
| | | | | 705/14.71 |
| 2010/0023966 | A1* | 1/2010 | Shahraray | H04N 21/4532 |
| | | | | 725/34 |
| 2013/0117111 | A1* | 5/2013 | Dyor | G06F 3/0481 |
| | | | | 705/26.1 |
| 2014/0222502 | A1* | 8/2014 | Urban | G06Q 30/0246 |
| | | | | 705/7.29 |
| 2016/0034976 | A1* | 2/2016 | Dayanand | G06F 3/04842 |
| | | | | 705/14.73 |
| 2017/0024098 | A1* | 1/2017 | Doherty | G11B 27/11 |
| 2017/0193566 | A1* | 7/2017 | Lucash | G06Q 30/0277 |
| 2017/0358321 | A1* | 12/2017 | Kilar | G11B 27/028 |
| 2018/0197575 | A1* | 7/2018 | Doherty | G06Q 30/0276 |
| 2018/0260492 | A1* | 9/2018 | Rokos | G06F 3/0485 |
| 2019/0272064 | A1* | 9/2019 | Ghassabian | G06F 3/011 |

FOREIGN PATENT DOCUMENTS

| | | | | |
|---|---|---|---|---|
| CA | 2929099 | A1 * | 5/2014 | ......... G06F 3/04817 |
| EP | 2866165 | A1 * | 4/2015 | ............. G06F 21/31 |
| GB | 2600255 | A * | 4/2022 | ............. G05B 17/02 |

* cited by examiner

SYSTEM AND METHOD FOR SERVING INTERACTIVE ADVERTISING CONTENT WITH RESPONSIVE ANIMATIONS

CROSS-REFERENCE TO RELATED APPLICATIONS

This application is a continuation of U.S. patent application Ser. No. 17/561,688, filed on 23 Dec. 2021, which is a continuation of U.S. patent application Ser. No. 17/349,706, filed on 16 Jun. 2021, which claims the benefit of U.S. Provisional Application No. 63/040,694, filed on 18 Jun. 2020, and is a continuation-in-part application of U.S. patent application Ser. No. 17/039,961, filed on 30 Sep. 2020, which is a continuation application of U.S. patent application Ser. No. 15/937,062, filed on 27 Mar. 2018, which is a continuation application of U.S. patent application Ser. No. 15/816,833, filed on 17 Nov. 2017, which is a continuation application of U.S. patent application Ser. No. 15/217,879, filed on 22 Jul. 2016, which claims priority to U.S. Provisional Application No. 62/197,929, filed on 28 Jul. 2015 and is a continuation-in-part application of PCT Application No. PCT/US15/64460, filed on 8 Dec. 2015, which claims priority to U.S. Provisional Application No. 62/068,646, filed on 25 Oct. 2014, each of which are incorporated in its entirety by this reference.

TECHNICAL FIELD

This invention relates generally to the field of digital advertising and more specifically to a new and useful method for augmenting digital advertisements with responsive transformations in the field of digital advertising.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-3B, a method S100 for serving interactive advertising content to a user includes, at a visual element inserted within an electronic document rendered within a window (or "viewport") of a computing device accessed by a user, loading an interactive visual advertisement into the visual element in Block S140, the interactive visual advertisement including a digital advertisement including advertising content distinct from the electronic document and a mask: including a base layer defining a first opacity; including an aperture defining a second opacity less than the first opacity; and defining a sequence of transformations. The method S100 further includes, at the visual element, in response to a first scroll event, entered by the user at the computing device, that moves the visual element from an initial position outside the window to a first position within the window: rendering the digital advertisement within the visual element; and rendering the mask over the digital advertisement, the mask revealing a first region of the digital advertisement in Block S150. The method S100 further includes, at the visual element, in response to a first scroll-down event that moves the visual element to a second position above the first position within the window, transforming the mask according to the sequence of transformations at a first rate proportional to a first scroll rate of the first scroll-down event, the sequence of transformations modifying the mask to reveal a sequence of regions of the digital advertisement and corresponding to a sequence of vertical positions of the visual element within the window in Block S160.

Figure 3A:
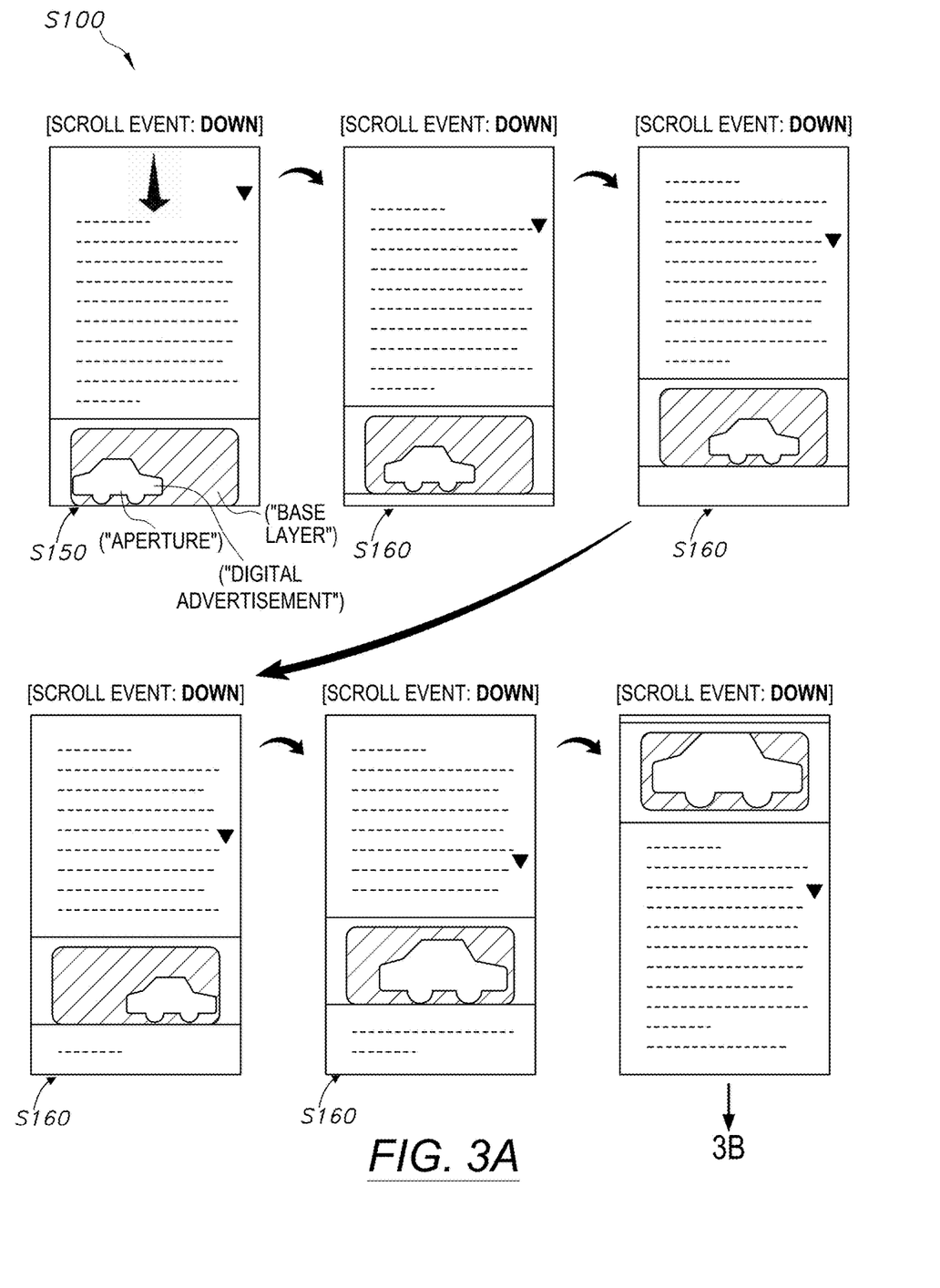
FIGS. 3A and 3B are flowchart representations of the method.
Figure 3B:
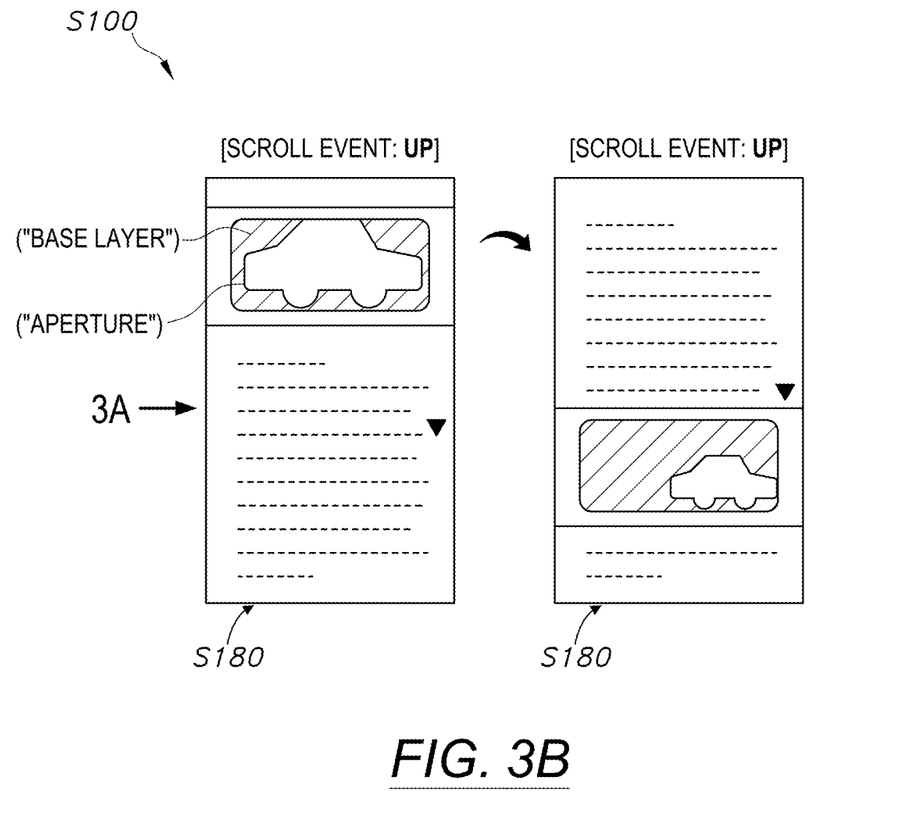

In one variation, as shown in FIG. 3B, the method S100 further includes, in response to a first scroll-up event that moves the visual element to a third position below the second position within the window: transforming the mask according to a second sequence of transformations at a second rate proportional to a second scroll rate of the first scroll-up event, the second sequence of transformations corresponding to a second sequence of vertical positions of the visual element within the window in Block S180.

Figure 1:
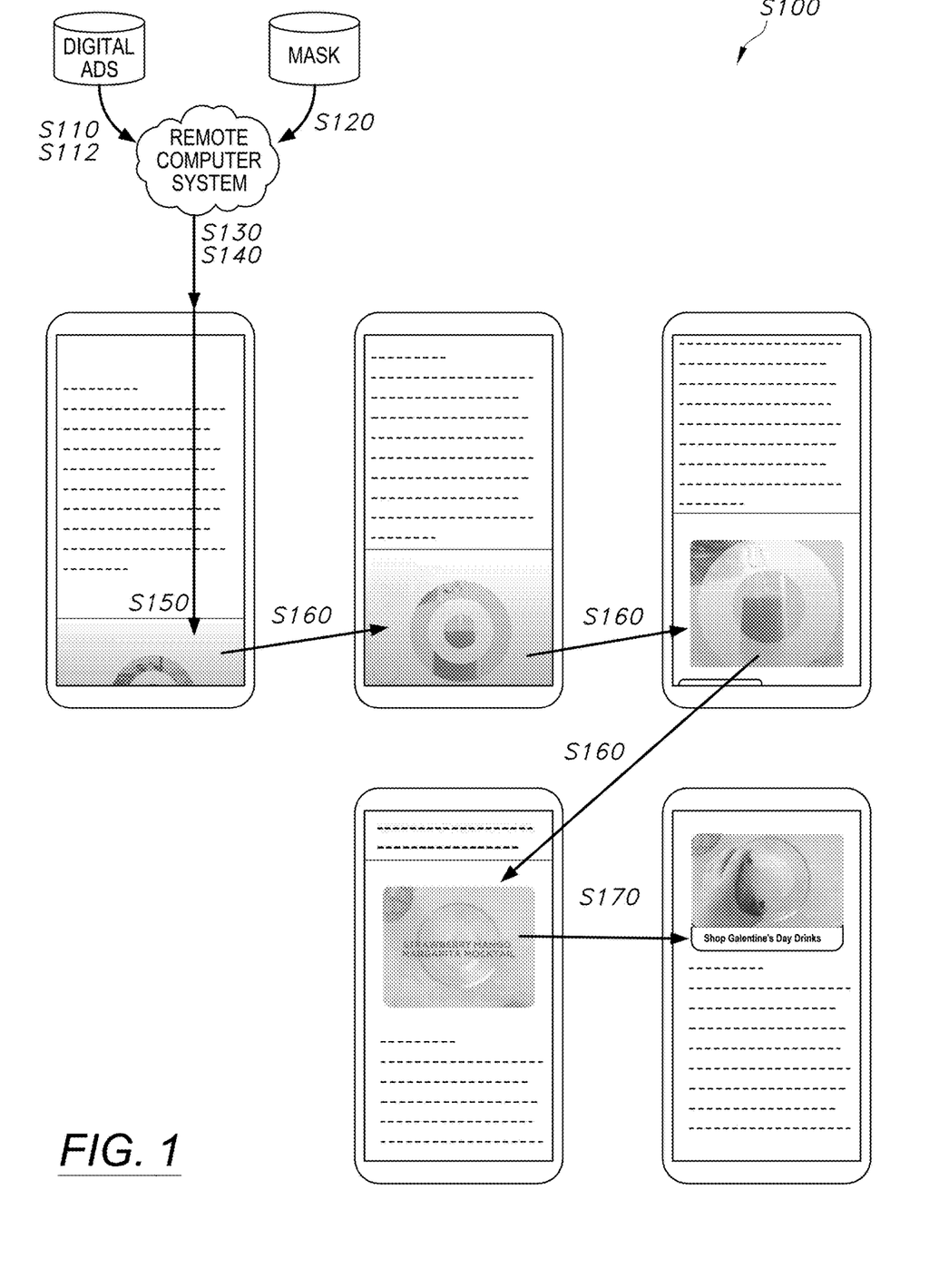
FIG. 1 is a flowchart representation of a method.
Figure 2:
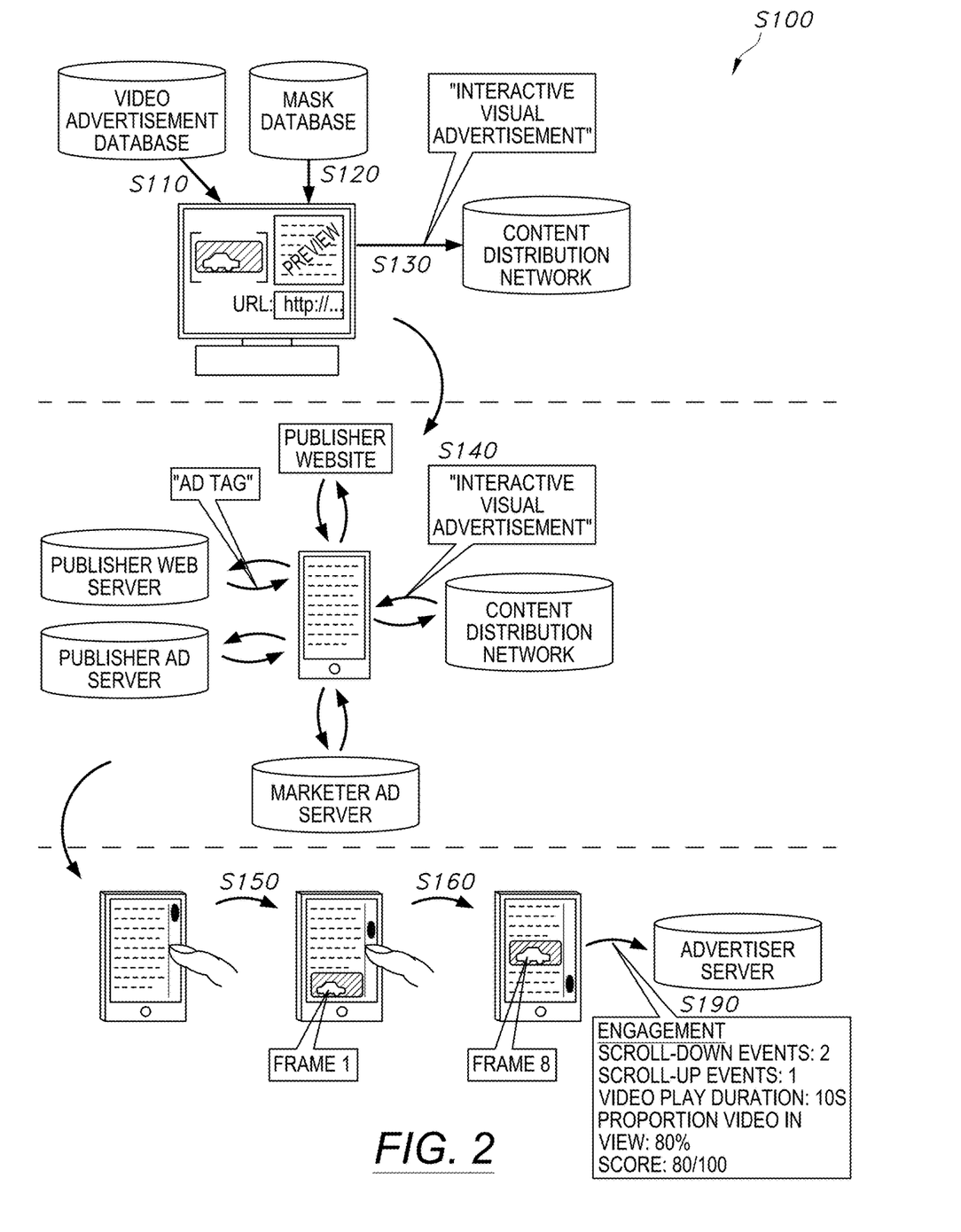
FIG. 2 is a flowchart representation of the method.

In one variation, as shown in FIG. 2, the method S100 further includes estimating an engagement score for the user interacting with the interactive visual advertisement based on user interactions with the interactive visual advertisement in Block S190.

As shown in FIGS. 1-3B, one variation of the method S100 includes, at an interactive visual advertisement into the visual element in Block S140, the interactive visual advertisement including a digital advertisement comprising advertising content distinct from the electronic document and a mask including a base layer configured to obscure the digital advertisement and a set of apertures: arranged within the base layer; defining a silhouette of an icon affiliated with the video advertisement; and configured to reveal regions of the digital advertisement. The method S100 further includes, in response to a first scroll event, entered by the user at the computing device, that moves the visual element from an initial position outside the window to a first position within the window: rendering the digital advertisement within the visual element; and rendering the mask over the digital advertisement, the mask revealing a first region of the digital advertisement behind the base layer in Block S150. The method S100 further includes, in response to a first scroll-down event that moves the visual element to a second position above the first position within the window, animating the set of apertures within the mask to reveal a sequence of regions of the digital advertisement according to vertical positions of the visual element within the window in Block S160.

As shown in FIGS. 1-3B, one variation of the method S100 includes, at a visual element inserted within an electronic document rendered within a window of a computing device accessed by a user, loading an interactive visual advertisement into the visual element in Block S140, the interactive visual advertisement including a digital advertisement including advertising content distinct from the electronic document; and a mask configured to obscure a proportion of the video advertisement linked to a vertical position of the visual element within the window. The method S100 further includes, in response to a first scroll event, entered by the user at the computing device, that moves the visual element from an initial position outside the window to a first position within the window: rendering the digital advertisement within the visual element; and rendering the mask over the digital advertisement, the mask obscuring a first proportion of the digital advertisement in Block S150. The method S100 further includes, in response to a first scroll-down event that moves the visual element to a second position above the first position within the window, transforming the mask, rendered over the digital advertisement, to reduce the proportion of the digital advertisement, obscured by the mask, from the first proportion to a second proportion less than the first proportion during the first scroll-down event in Block S160.

As shown in FIGS. 1-3B, one variation of the method S100 for serving interactive content to a user includes, at a remote computer system: receiving identification of a digital advertisement selected for an advertisement slot in a document accessed at a computing device associated with a user in Block Silo; accessing a set of characteristics of the digital advertisement in Block S112; selecting a mask, from a set of masks, based on the set of characteristics of the digital advertisement in Block S120, the mask defining a responsive transformation and including a base layer defining a first opacity and an aperture defining a second opacity less than the first opacity; overlaying the mask over the digital advertisement to generate an interactive visual advertisement in Block S130; and inserting the interactive visual advertisement into a visual element loaded into the advertisement slot in Block S140. The method S100 also includes, at the visual element: in response to a first scroll event that moves the visual element to a first position in view of a window rendered on a display of the computing device, rendering the interactive visual advertisement inside the visual element in Block S150; and, in response to a second scroll event that moves the visual element to a second position in the window above the first position, animating the mask according to the responsive animation in Block S160.

As shown in FIGS. 1-3B, one variation of the method includes, at the remote computer system, selecting the mask, from the set of masks, based on the set of characteristics of the digital advertisement in Block S120, the mask including the base layer and the aperture and defining a responsive transformation including a sequence of transformations; overlaying the mask over the digital advertisement to generate an interactive visual advertisement in Block S130; and loading the interactive visual advertisement into the visual element in Block S140. In this variation, the method S100 also includes, at the visual element: in response to the first scroll event, rendering the interactive visual advertisement inside the visual element in Block S150; and, in response to the second scroll event, transforming the mask according to the sequence of transformations at a rate proportional to a scroll rate of the second scroll event, the sequence of transformations corresponding to a sequence of vertical positions of the visual element within the window in Block S160.

As shown in FIGS. 1-3B, one variation of the method includes, at the remote computer system, selecting the mask, from the set of masks, based on the set of characteristics of the digital advertisement, the mask defining a sequence of transformations and including the base layer, the aperture, and a call to action in Block S120; overlaying the mask over the digital advertisement to generate an interactive visual advertisement in Block S130; and loading the interactive visual advertisement into a visual element loaded into the advertisement slot in Block S140. In this variation, the method also includes, at the visual element: in response to the first scroll event, rendering the interactive visual advertisement inside the visual element in Block S150; in response to the second scroll event, transforming the mask according to the sequence of transformations at a rate proportional to a scroll rate of the second scroll event, the sequence of transformations corresponding to a sequence of vertical positions of the visual element within the window in Block S160; and, in response to a third scroll event that moves the visual element to a third position within the window above the second position, revealing a call-to-action beneath the mask in Block S170.

2. Applications

Generally, Blocks of the method S100 can be executed by a remote computer system—such as a remote server functioning as or interfacing with an advertisement server—to pair a digital advertisement (e.g., a static image or video advertisement) with a mask to generate an interactive visual advertisement. The mask can define a responsive transformation that reveals regions of the digital advertisement responsive to user inputs—such as a scroll input (e.g., scroll-up or scroll-down) or a swipe (e.g., a left or right swipe)—within a window (e.g., a webpage, native application) in which the digital advertisement is rendered at a computing device. In particular, the computer system can overlay a mask—defining low-transparency and high-transparency regions that change as a function of input (e.g., position in a window rendered on a computing device)—over a static digital advertisement in order to generate a responsive advertisement or over a responsive digital advertisement in order to augment responsive modalities of the responsive digital advertisement. The remote computer system (or an advertisement server) can then upload this interactive visual advertisement to a visual element loaded into an advertisement slot on a webpage (or native application) opened at a computing device. The visual element can then: render the digital advertisement; render the mask over the digital advertisement; and transform the mask (i.e., move or modify low-transparency and high-transparency regions of the mask) overlaid over the digital advertisement according to responsive transformation parameters defined by the mask and responsive to user inputs at the computing device in order to reveal and/or obscure different regions of the digital advertisement.

The mask can be loaded with a responsive transformation that defines color and/or opacity of pixels—over a digital advertisement—as a function of one or more inputs within a window rendered on a computing device (e.g., scroll, swipe, zoom, select) or at the computing device more generally (e.g., tilt, shake). Thus, when an interactive visual advertisement, including the mask overlaid the digital advertisement, is loaded into a visual element inserted into an advertisement slot rendered on a computing device, the visual element can render and transform the interactive visual advertisement responsive to user inputs according to the responsive transformation. For example, upon receipt of a digital advertisement, the remote computer system can pair the digital advertisement with a mask to generate an interactive visual advertisement. The mask can define a responsive transformation defining a sequence of transformations, each transformation in the sequence of transformations decreasing an opacity of the base layer responsive to scroll events. The mask can include a base layer exhibiting a first opacity (e.g., 100%) and include an aperture exhibiting a shape (e.g., an apple) corresponding to a product (e.g., a grocery delivery service) advertised in the digital advertisement.

Upon insertion of the interactive visual advertisement into a visual element on a webpage accessed by a computing device of a user, the visual element can overlay the mask over the digital advertisement, such that a first region of the digital advertisement is bounded by the aperture. Then, in response to a first scroll event that moves the visual element from an initial location outside a window of the computing device to a first location within the window, the visual element can render the mask over the digital advertisement, such that a first region of the digital advertisement bounded by the aperture is visible to the user and a remainder of the digital advertisement is obscured by the base layer exhibiting the first opacity. Then, in response to a second scroll event that moves the visual element from the first location to a second location within the window, the visual element can modify the mask according to a first transformation—in the sequence of transformations—linked to the second location, such as: by decreasing the opacity of the base layer from the first opacity (e.g., 100%) to a second opacity (e.g., 90%); by expanding (or collapsing) the base layer by a first degree (e.g., 2×); or by translating the mask laterally or vertically relative to the digital advertisement to reveal more of the digital advertisement. As the user continues scrolling down and the visual element continues moving toward a top of the window, the visual element can continue to: reduce the opacity of the base layer according to the sequence of transformation layers (e.g., until the complete digital advertisement is revealed); expand (or collapsing) the base layer to further reveal the digital advertisement below; or translate the mask laterally or vertically relative to the digital advertisement to further reveal the digital advertisement.

In one variation, once the complete digital advertisement is revealed (e.g., once the opacity of the base layer reaches 0%), the visual element can also reveal a call-to-action (e.g., "TRY GROCERY DELIVERY TODAY!") along a border of the mask according to a last transformation—in the sequence of transformations—corresponding to a third location more than a threshold distance from a bottom of the window. Thus, the visual element can transform the mask from an aperture that reveal regions of the digital advertisement as a function of user input to a call-to-action overlay that links further input at the computing device to an action.

Thus, by pairing the digital advertisement with a mask including an aperture exhibiting a particular shape (or silhouette), color, pattern, or any other type of filter, the visual element can immediately contextualize the digital advertisement (e.g., a video advertisement) rendered beneath the mask for the user viewing the digital advertisement.

The aperture can define a particular shape and/or scale, such as a function of position on a webpage. For example, upon identification of a digital advertisement including content related to a furniture store, the computer system can pair the digital advertisement with a mask including an aperture in the shape of a piece of furniture (e.g., a chair, a bed, a couch) to generate an interactive visual advertisement in which the shape of the aperture immediately contextualizes the digital advertisement below for a user viewing the interactive visual advertisement.

2.1 Real-Time to Preloaded Mask

In one implementation, the remote computer system pairs a digital advertisement with a mask in (near) real-time before serving this combination to a computing device that then renders this mask over the digital advertisement according to inputs at the computing device. In this implementation, the remote computer system can receive identification of a digital advertisement selected for an advertisement slot in a document accessed at a computing device associated with a user and match the digital advertisement with a mask configured to visually modify the digital advertisement and transform responsive to user inputs (e.g., user scrolling). The mask can include a base layer configured to (initially) obscure a portion of the digital advertisement and an aperture within the base layer through which a user may view a portion of the digital advertisement bounded by the aperture. Additionally, the visual element can modify a design (e.g., color, pattern, texture) of the base layer (e.g., configured to fill the advertisement slot) to match a background of the webpage, such that the base layer is "invisible" to the user. By thus altering a perceived shape of the digital advertisement (e.g., in the shape of the aperture), the remote computer system can draw greater attention from the user, who may be conditioned to viewing rectangular advertisements. Additionally, the aperture can be configured to exhibit a shape or design (e.g., a logo, an icon) related to content of the digital advertisement. Therefore, because the user may be more likely to view an advertisement for a particular product or brand associated with the shape or design of the aperture, the remote computer system can increase a likelihood of achieving a target outcome (e.g., conversion, brand lift).

Alternatively, the remote computer system can preload a digital advertisement with a mask and store this interactive visual advertisement for later deployment to advertisement slots viewed across a population of computing devices. For example, the remote computer system can: select a static or responsive advertisement for a particular brand; and retrieve a mask defining an aperture (i.e., a low-opacity or full-transparent region) in the shape of a logo or icon affiliated with the brand and defining an opaque (or low-transparency) region outside of the aperture. The remote computer system can then define a responsive transformation that increases (or decreases) the scale of the mask—and thus expands the aperture across the full width and height of the digital advertisement—as a function of position on a webpage, such as: to a scale of 1× when the top row of pixels of the interactive visual advertisement is rendered in a window; or to a scale of 10× (or 0×) to fully-reveal the digital advertisement when the vertical center of the interactive visual advertisement reaches the vertical center of the window. The remote computer system can then fuse the digital advertisement and the mask to form the interactive visual advertisement, which may later be matched and served to an advertisement slot on a webpage viewed by a user at a computing device.

In one variation, the remote computer system can preload a digital advertisement with a preset mask automatically paired to this digital advertisement. For example, a brand or advertiser associated with a digital advertisement may specify a preset mask for this digital advertisement. The remote computer system can then fuse the digital advertisement and the preset mask to form the interactive visual advertisement, which may later be matched and served to an advertisement slot on a webpage viewed by a user at a computing device. In this variation, the remote computer system can also modify characteristics (e.g., color, shape, size, responsive animation) defined by the preset mask before and/or after the interactive visual advertisement is matched and served to an advertisement slot on a webpage viewed by a user at a computing device.

In the foregoing implementations, when loaded with the interactive visual advertisement at an advertisement slot on a webpage, a visual element can also query the webpage for a background color and update the pixel color of the opaque region of the mask: such that the opaque region of the mask and the corresponding region of the digital advertisement appear to seamlessly blend into the background of the webpage; and such that only the region of the digital advertisement aligned with the aperture is visibly distinct from the background, which can be nonrectangular in shape, which can be distinct from other rectangular content (e.g., rectangular images) on the webpage, and which can thus draw the user's attention to the digital advertisement.

2.2 Input Types

The method S100 is described below as a method for generating and serving an interactive visual advertisement (and an interactive video ad) based on scroll events that move a visual element vertically within a window rendered on a display of a computing device. However, the method S100 can be implemented to generate and serve any other type of visual content based on any other scroll or scroll-like input, such as horizontal scroll events or rotational or actuate gestures at a computing device.

3. Digital Advertisement and Mask Pairs: Interactive Visual Advertisements

The remote computer system can pair a digital advertisement with a mask defining a responsive transformation to form an interactive visual advertisement that is responsive to user interactions (e.g., scroll events) at the mobile device. For example, the remote computer system can load a video advertisement into a visual element inserted on a webpage and overlay a mask over the video advertisement to generate an interactive visual advertisement responsive to scroll events (e.g., the user scrolling up and down the webpage over the interactive visual advertisement) which trigger the visual element to transform the mask while playing the video advertisement beneath the mask.

In one implementation, the remote computer system can select a mask for pairing with a digital advertisement in a particular advertisement slot based on: digital advertisement characteristics (e.g., advertisement format, types of creative contained inside the digital advertisement, and a type or brand or product depicted in the mobile ad); environment characteristics (e.g., device operating system, wireless carrier, wireless connectivity, webpage publisher, and native content on the webpage); and/or user characteristics (e.g., the user's demographic, location, historical engagement with various masks and digital ads). The remote computer system can thus select and serve the selected engagement layer to an advertisement loaded into an advertisement slot in a webpage accessed on the user's mobile device as the mobile device loads this webpage. The advertising server can approximately concurrently select and serve the digital advertisement to the advertisement slot as the user's mobile device loads this webpage.

Therefore, the remote computer system and a separate or coextensive advertising server can select a mask and a digital advertisement for pairing at a visual element to form an interactive visual advertisement in order to generate a new animation or presentation of the digital advertisement—such as matched to user, environment, and digital advertisement characteristics—and thus increase user engagement with the digital advertisement. In particular, the mask can define a "mask effect" including a responsive mask, overlay, or effect that can be applied over a static or dynamic (e.g., video) digital advertisement in order to: expand responsiveness of the resulting interactive visual advertisement to user interactions; yield a more engaging interactive visual advertisement for the user; and thus improve the outcome of this interactive visual advertisement (e.g., click-through or engagement along a particular target outcome). The remote computer system can also select different masks (or "mask effects") for a particular digital advertisement over time—such as for different users, user locations, types of mobile devices, or webpages served the same digital advertisement—in order to better match (or "customize") responsive characteristics of the particular digital advertisement to characteristics of these users.

4. Visual Element

Generally, the remote computer system can serve a visual element (e.g., an iframe element)—containing a digital advertisement and a mask, configured to record engagement data (e.g., scrolls, tilts, swipes, gestures), and configured to return these engagement data to the computer system—to a user's computing device. The user's computing device can then insert this visual element into an advertisement slot within a webpage rendered within a web browser executing on the mobile device. The visual element can render the digital advertisement wrapped with or covered by the mask to form an interactive visual advertisement that responds to (i.e., changes responsive to) actions (e.g., user inputs) occurring on the computing device, such as scroll, swipe, tilt, or motion events as described below and shown in FIG. 1.

5. Digital Advertisement

Block S110 of the method S100 recites receiving identification of a digital advertisement selected for an advertisement slot in a document accessed at a computing device associated with a user in Block S110. Generally, in Block S110, the remote computer system receives (or accesses) a digital advertisement file (e.g., digital video file)—such as from a local machine or local network or pulled from a remote server or remote database.

The digital advertisement can include creative content—such as text, iconography, images, and/or video—arranged in a static or responsive advertisement format. In one example, the digital advertisement includes a static image overlaid with text and containing a link to an external webpage. In another example, the digital advertisement includes a video configured to start playback when a visual element containing the digital advertisement enters a window rendered on a mobile device, configured to pause playback when the visual element exits the window on the mobile device, and containing a link to an external webpage. In yet another example, the digital advertisement includes a set of virtual cards arranged horizontally in a magazine, wherein the magazine is configured to index laterally through the set of cards responsive to swipe inputs over the mobile ad, and wherein each card contains a unique image, iconography, and/or text and contains a link to a unique external webpage, such as described in U.S. patent application Ser. No. 15/677,259, filed on 15 Aug. 2017, which is incorporated in its entirety by this reference. In another example, the digital advertisement includes a sequence of video frames, is configured to index forward through this sequence of video frames responsive to scroll-down inputs at a webpage rendering this digital advertisement element, is configured to index backward through this sequence of video frames rendered responsive to scroll-up inputs at the webpage rendering this mobile ad, and containing a link to an external webpage, such as described in U.S. patent application Ser. No. 15/217,879, filed on 22 Jul. 2016, which is incorporated in its entirety by this reference.

However, the digital advertisement can include any other type or combination of creative content in any other format and containing a link to any other one or more external resources. A population of mobile advertisements within a body of current advertising campaigns can be stored in a remote database; and an advertisement server can select from this population of mobile advertisements to serve to a mobile device for insertion into an advertisement slot within a webpage.

5.1 Video Advertisement Playback

In one implementation, the interactive visual advertisement includes a video advertisement and a mask overlaid the video advertisement. In this implementation, the video advertisement can be configured to start playback when a visual element containing the video advertisement enters a window rendered on a computing device (e.g., a mobile device) accessed by a user. Thus, the visual element can be configured to automatically trigger playback of the video advertisement, within the visual element, responsive to the visual element entering the window on a display of the computing device, such that playback of the video advertisement is visible to the user.

In one example, the visual element can be configured to render a static image—such as a final frame of the video advertisement—upon completion of playback of the video advertisement. Additionally and/or alternatively, the visual element can render a call-to-action and/or an icon within the visual element (e.g., over or adjacent the static image) configured to receive user inputs (e.g., a click or swipe input). Then, in response to receiving a user input over the icon, the visual element can trigger the computing device to open an expanded window, over the visual element, including the video advertisement. The user may then continue viewing playback of the video advertisement within this expanded window.

In particular, in this example, in response to the visual element moving from an initial position (e.g., initial vertical position) outside the window of the display to a first position within the window, the visual element can: render the interactive visual advertisement—including the mask overlaid a first frame of the video advertisement—within the visual element; and trigger playback (e.g., forward playback) of the video advertisement from the first frame toward a final frame of the video advertisement. Then, in response to the visual element rendering the final frame of the video advertisement, the visual element can: render a static image—such as the final frame of the video advertisement—including advertising content related to the video advertisement; and render an icon adjacent the static image and configured to trigger rendering of an expanded window, including the video advertisement, responsive to selection by the user. Alternatively, the visual element can be configured to render the static image responsive to a quantity of replays of the video advertisement exceeding a threshold quantity of replays (e.g., one replay, three replays, ten replays).

Alternatively, in another example, the visual element can be configured to replay the video advertisement within the visual element on a continuous loop while the video advertisement is rendered within the window of the display. In particular, in this example, in response to the visual element moving from an initial position (e.g., initial vertical position) outside the window of the display to a first position within the window, the visual element can: render the interactive visual advertisement—including the mask overlaid a first frame of the video advertisement—within the visual element; and trigger playback (e.g., forward playback) of the video advertisement from the first frame toward a final frame of the video advertisement. Then, in response to the visual element rendering the final frame of the video advertisement, the visual element can: render the first frame in replacement of the final frame; and trigger playback of the visual element from the first frame toward the final frame.

Additionally, during playback of the video advertisement, the visual element can continue animating the mask according to a responsive animation (e.g., including a sequence of transformations) as the user scrolls up and down (or enters any other type of user input that moves the visual element) within the electronic document, such that the user can continue to control animation of the mask while viewing playback of the video advertisement.

Additionally, in one implementation, during playback of the video advertisement, in response to the visual element moving from the first position within the window to a second position outside the window of the computing device, the visual element can: pause playback of the video advertisement at a last frame of the video advertisement viewed by the user while the visual element moves from within the window to outside the window; and, in response to the visual element moving from the second position outside the window to a third position within the window, initiate playback of the video advertisement from the last frame. Alternatively, in another implementation, the visual element can continue playback of the video advertisement once the visual element initially enters the window, such that the video advertisement continues to play if the visual element moves from a position within the window to a position outside the window. Alternatively, in yet another implementation, the visual element can trigger playback of the video advertisement from the first frame of the video advertisement each time the visual element enters (or reenters) the window (e.g., after moving from within the window to outside the window).

6. Mask Overlay

Generally, the mask is configured to overlay and visually modify a digital advertisement. The mask can be configured to obscure a portion of a digital advertisement while highlighting a select portion (e.g., in a particular shape or silhouette) of the digital advertisement. The mask can include a base layer configured to obscure a first portion of the digital advertisement behind (or "underneath") the base layer and an aperture (e.g., a "window" through the base layer) configured to highlight a second portion of the digital advertisement (e.g., a portion of a static image, a portion of each frame in a video) bounded by a perimeter of the aperture. Thus, for an interactive visual advertisement including the digital advertisement and the mask inserted into a visual element at an advertisement slot on a webpage accessed by a computing device, the visual element can render the mask—over the digital advertisement within the visual element—with the first portion of the digital advertisement obscured by the base layer and the second portion viewable (e.g., more clearly visible than the first portion) through the aperture.

For example, upon receipt of a video advertisement, the remote computer system can overlay the video advertisement with a mask defining a base layer exhibiting a first opacity (e.g., 75%, 100%) and an aperture exhibiting a second opacity (e.g., 0%) less than the first opacity to generate an interactive visual advertisement. Upon insertion of the interactive visual advertisement into a visual element on a webpage accessed by a computing device of a user, the visual element can: render the mask including the base layer exhibiting the first opacity and the aperture exhibiting the second opacity over the video advertisement; render a first frame of the video advertisement beneath the mask, a first portion of the first frame viewable through the aperture; and, in response to a scroll event that moves the visual element from an initial location outside a window on a display of the computing device to a first position within the window, initiate playback of the digital video from the first frame to a second frame succeeding the first frame in the digital video while maintaining the mask over frames of the digital video during playback. Therefore, as the user scrolls down the page and the visual element comes into view of the window, the visual element can begin playback of the video advertisement. Because the base layer of the mask hides (or obscures) regions of frames in the video advertisement outside the perimeter of the aperture, the user may only see (or be more drawn to) the portion of the video advertisement bounded by the aperture of the mask.

The mask also defines transformations or controls for changing the size, color, shape, opacity and/or position of the mask, aperture, base layer, and/or iconography included in the mask. Thus, for a digital advertisement and a mask paired to generate an interactive visual advertisement and loaded into a visual element inserted at an advertisement slot of a webpage accessed by a computing device, the visual element can: render the digital advertisement; render the mask over the digital advertisement, such that a first portion of the digital advertisement is obscured by the base layer of the mask and a second portion of the digital advertisement bounded by the aperture of the mask is highlighted (e.g., prominent); and/or modify the mask responsive to scroll events (e.g., scrolling by a user within the webpage over the visual element) based on a responsive transformation defined by the mask.

For example, the remote computer system can overlay the digital advertisement with a mask exhibiting a particular design (e.g., logo, icon, text keyword, blinds) associated with a brand or product associated with the digital advertisement.

Thus, the remote computer system can pair digital advertisements with masks including designs and/or content related to these advertisements to increase brand lift, increase advertising campaign lift, increase product awareness, increase the user's comprehension of the advertisement, and/or draw greater attention from the user.

6.1 Base Layer

The remote computer system can select a mask including a base layer configured to obscure a portion of a digital advertisement for pairing with the digital advertisement. Upon insertion of a resulting interactive visual advertisement into a visual element inserted at an electronic document rendered on a computing device, the visual element can: overlay the mask over the digital advertisement; and, in response to a scroll event that moves the visual element into view of a window rendered on a display of the computing device, render the mask over the digital advertisement, a portion of the digital advertisement (e.g., a portion outside a perimeter of a aperture included in the mask) concealed by the base layer. By (initially) obscuring a portion of the digital advertisement with the base layer of the mask, the visual element can draw a user's attention to a viewable (or less obscured) portion of the digital advertisement.

The base layer can define a width and a length equivalent a width and a length of the mask. In one implementation, the base layer (and the mask) can be configured to define a width and length equivalent a width and a length of the advertisement slot (e.g., on a webpage) at which the visual element is inserted. The visual element can modify these dimensions of the base layer upon receiving the interactive visual advertisement to match the dimensions of the advertisement slot. For example, an advertisement slot can define a rectangular shape defining a first width and a first length and exhibit a fill color (e.g., white) distinct from a color of a background of the webpage. Upon receiving an interactive visual advertisement including a mask and a digital advertisement, the mask initially sized to cover the digital advertisement and including a base layer and a aperture arranged over a particular region of the digital advertisement, the visual element can extend a width and a length of the base layer, without affecting placement or dimensions of the aperture, such that the mask fills the advertisement slot. Therefore, in this implementation, the visual element can resize the base layer to eliminate empty space within the advertisement slot.

In one implementation, the visual element can render the mask such that the base layer exhibits a design configured to blend into a background of a webpage outside of an advertisement slot at which the visual element is inserted. For example, upon insertion of an interactive visual advertisement including a digital advertisement and a mask into a visual element loaded into a webpage accessed by a computing device, the visual element can: overlay the mask over the digital advertisement; adjust a size of a base layer of the mask to match a size of an advertisement slot at which the visual element is located; transform a design (e.g., color, pattern, texture) of the base layer to match a design of a background surrounding the advertisement slot (e.g., bordering a perimeter of the advertisement slot); and, in response to a scroll event that moves the visual element into view in a window of a display of the computing device, render the interactive visual advertisement including the base layer matched to the background and concealing a first portion of the digital advertisement and the aperture displaying the second portion of the digital advertisement bounded by the aperture.

In this implementation, the remote computer system can serve interactive visual advertisements to a user that appear—to the user—to exhibit a particular shape, corresponding to a shape of the aperture included in the mask, by transforming the design of the base layer of the mask. For example, the remote computer system can pair a digital advertisement including content related to Halloween supplies with a mask including an aperture exhibiting a pumpkin shape to generate an interactive visual advertisement. Upon insertion of the interactive visual advertisement into a visual element loaded into a webpage accessed by a computing device, the visual element can: overlay the mask over the digital advertisement; adjust a size of a base layer of the mask to match a size of an advertisement slot at which the visual element is located; and detect a webpage design (e.g., color, pattern, texture) corresponding to a background of the webpage at which the advertisement slot is located. In this example, in response to detecting a particular shade of gray corresponding to the background of the webpage, the visual element can transform the base layer of the mask to exhibit the particular shade of gray, such that the base layer "blends into" the background of the webpage. Thus, only a pumpkin-shaped portion of the interactive visual advertisement is visible to the user, while the base layer of the mask and the advertisement slot remain "invisible" to the user.

Therefore, the remote computer system can adjust a layout and/or design of the mask—including the base layer and aperture—to modify a perceived shape of the interactive visual advertisement, as perceived by a user viewing the interactive visual advertisement. The visual element can thus: draw greater attention from the user; increase the user's comprehension of the digital advertisement within the visual element (e.g., based on the perceived shape of the interactive visual advertisement); and increase likelihood that the user will exhibit a target outcome, such as: a "click" on the digital advertisement; a minimum amount of time spent viewing the digital advertisement; a threshold completion rate of a video advertisement; and/or a minimum brand lift.

6.1.1 Base Layer Iconography

The base layer can include iconography configured to increase a user's comprehension of the interactive visual advertisement. For example, the base layer can include a logo of a brand associated with the interactive visual advertisement. In another example, the base layer can include images related to content in the interactive visual advertisement, such as an image of a palm tree for an interactive visual advertisement related to a tropical vacation package.

6.2 Aperture

The remote computer system can select a mask—for pairing with a digital advertisement—that includes a particular aperture configured to highlight a portion of the digital advertisement. In particular, the mask can include a set of apertures (e.g., a single aperture, multiple apertures) arranged within the base layer and configured to reveal regions of the digital advertisement. Additionally, the set of apertures can define a silhouette of an icon (e.g., a logo for a brand, a symbol related to advertising content in the video advertisement, a particular shape or pattern) affiliated with the video advertisement. The aperture can be configured to: draw a user's attention to the interactive visual advertisement by modifying a perceived shape (e.g., as perceived by the user) of the interactive visual advertisement; and/or increase a user's understanding of advertising content contained in the interactive visual advertisement based on a shape of the aperture.

The aperture can define a particular shape and/or scale, such as a function of position on a webpage. For example, upon identification of a digital advertisement containing content related to a furniture store, the computer system can pair the digital advertisement with a mask including an aperture in the shape of a piece of furniture (e.g., a chair, a bed, a couch) to generate an interactive visual advertisement in which the shape of the aperture immediately contextualizes the digital advertisement below for a user viewing the interactive visual advertisement.

Further, the aperture can define a particular opacity, color, or any other type of filter through which the user may view the digital advertisement (e.g., a static image or frames of a digital video). For example, an interactive visual advertisement can include a video advertisement for an aquarium. In this example, the interactive visual advertisement can also include a mask, overlaid the video advertisement, including an aperture (e.g., defining a silhouette or shape of a shark) including a blue-tinted filter defining an underwater effect. The user may then view the video advertisement for the aquarium through this blue-tinted filter, such that frames of the video advertisement appear underwater when viewed by the user. This "underwater" filter therefore immediately contextualizes the video advertisement for the aquarium for the user while or before the user views and/or processes the video advertisement.

The aperture can additionally or alternatively be arranged in a particular region of the mask to align with—and therefore reveal—particular visual content of the digital advertisement below as the interactive visual advertisement is moved into view at a webpage or when the greatest proportion of the digital advertisement is otherwise obscured by the mask. Thus, upon insertion of the interactive visual advertisement at a visual element loaded in a webpage accessed by a user on her computing device, the visual element can overlay the mask over the digital advertisement according to an initial placement such that the aperture aligns with a particular region of the video advertisement. Then, in response to a scroll event that moves the visual element from an initial position outside a window of a display rendered on the computing device to a first position within the window, the visual element can: render the mask over the digital advertisement; and render the digital advertisement beneath the mask such that the particular region of the video advertisement bounded by a perimeter of the aperture is highlighted (e.g., visible, less obscured) to the user.

For example, an interactive visual advertisement can include a digital advertisement including a video of a shopper walking into a brand's store and a mask including an aperture exhibiting a silhouette of the brand's logo. Once loaded into a visual element at a webpage accessed on a computing device associated with a user, the visual element can overlay the mask over the digital advertisement such that the aperture aligns with a brand logo on a store front of the brand's store in a first frame of the video. Then, in response to a first scroll event that moves the visual element from an initial position outside a window of display rendered on the computing device to a first position within the window, the visual element can render the interactive visual advertisement such that a portion of frames of the video advertisement bounded by the aperture—including the brand logo on the store front—is highlighted to the user. As the visual element moves further up within the window (e.g., responsive to the user scrolling down the webpage), the visual element can animate the mask (e.g., by expanding a size of the aperture) to reveal the shopper walking into the brand's store.

In one variation, the mask includes multiple discrete apertures. For example, upon identification of a video advertisement containing content related to a car dealership, the computer system can pair the video advertisement with a mask including a base layer and a first and second aperture to generate an interactive visual advertisement. In this example, the base layer can include a side-view image of a car. The first aperture can be aligned to a first window (e.g., front, driver-side window) of the car, and the second aperture can be aligned to in a second window (e.g., back, driver-side window) of the car. Thus, when a user scrolls through a webpage in which the interactive visual advertisement is loaded in an advertisement slot and brings the interactive visual advertisement into view, the user may see the image of the car and view the video advertisement through the "windows" of the car in the video advertisement.

6.2.1 Branded Apertures

The remote computer system can pair a digital advertisement with a mask including an aperture exhibiting a particular shape (or silhouette) or pattern associated with a brand affiliated with the digital advertisement. For example, the remote computer system can: upload a digital video associated with a first brand into a visual element inserted into an electronic document rendered within a window by a computing device associated with a user; access a set of masks in a database; select a first mask defining an aperture exhibiting a shape or silhouette corresponding to a logo of the first brand; overlay the digital video with a first mask to generate an interactive visual advertisement; and, in response to a scroll event at the computing device of the user that brings the interactive visual advertisement into view at a bottom of the window, render the mask and the digital advertisement (e.g., behind the mask), such that the user initially sees only a particular region of the digital advertisement bounded by a perimeter of (or viewable through) the aperture (e.g., in the shape of the brand's logo). In one example, the remote computer system can pair a digital advertisement for "Brian's Bagels", with a mask including an aperture exhibiting a shape of a logo associated with "Brian's Bagels".

Additionally, the remote computer system can pair the digital advertisement with a mask including an aperture exhibiting a particular color scheme or filter associated with a brand affiliated with the digital advertisement, as described above. For example, the remote computer system can pair a digital advertisement for a new car from a particular brand with a mask including an aperture exhibiting a silhouette matched to a logo for the particular brand. Further, the aperture can be configured to exhibit a color pattern (e.g., transparent shading through which the user may view the digital advertisement) matched to the color pattern of the logo. In this example, as the user scrolls up and down a webpage including this digital advertisement, the mask overlaid the digital advertisement, the visual element can adjust transparency of the color pattern, such that the color pattern begins to fade as the user scrolls down the webpage and the visual element moves upward within a window of a display of the user's computing device (e.g., mobile device).

Therefore, the remote computer system can pair a digital advertisement with a mask including an aperture exhibiting a particular shape or silhouette (e.g., of a logo), or exhibiting any other visual characteristics (e.g., colors, patterns, filters), configured to promote brand and product awareness. By strategically selecting masks including apertures related to brands, the remote computer system can increase a likelihood of achieving a target brand lift. Additionally, a user may be more likely to view or continue viewing a digital advertisement related to a brand the user recognizes.

6.2.2 Generic Apertures

In one variation, the remote computer system can select a mask defining an aperture of a particular icon for a particular digital advertisement based on an association of content of the particular advertisement (e.g., product, brand, place, event) with the particular icon.

For example, the remote computer system can: receive a digital advertisement including content related to a fast-food restaurant chain; access a set of icons sorted by category (e.g., food, activities, places, goods, etc.); select a burger icon, from the set of icons, based on an association between the burger icon and content related to fast-food restaurant chains; generate a mask for the digital advertisement including a first aperture exhibiting a shape and features of the burger icon; load the digital advertisement into a visual element inserted into an electronic document rendered within a window by a computing device associated with a user; overlay the digital advertisement with the mask including the first aperture (e.g., a aperture in the shape of a burger); and, in response to a scroll event at the computing device of a user that brings the interactive visual advertisement into view at a bottom of the window, render the mask and the interactive visual advertisement (e.g., behind the mask), such that the user initially sees only a portion of the interactive visual advertisement viewable through the aperture (e.g., in the shape of the brand's logo). Therefore, by pairing a mask including a generic aperture (or shape) related to content of the digital advertisement with the digital advertisement, the remote computer system can increase a user's understanding of content within the interactive visual advertisement and/or generate user interest in the interactive visual advertisement based on the shape of the aperture.

6.3 Responsive Transformation

The mask can define a responsive transformation that is responsive to user inputs, such as a scroll, swipe, or tilt event at a computing device (e.g., mobile device) of a user at which the visual element is loaded. Upon insertion of an interactive visual advertisement including the mask at a visual element loaded into a webpage, the visual element can transform (or reconfigure) the mask according to the responsive transformation.

In one implementation, the mask defines a responsive transformation defining a sequence of transformations linked to a sequence of (vertical) positions of the visual element within a window of a computing device. In this implementation, the mask can define a first sequence of transformations responsive to a scroll-down event (e.g., that moves the visual toward a top of the window) and a second sequence of transformations responsive to a scroll-up event (e.g., that moves the visual toward a bottom of the window).

For example, the mask can define a responsive transformation defining a sequence of transformations, each transformation in the sequence of transformations expanding a size of an aperture within the mask responsive to the user scrolling down within the webpage, thereby moving the visual element up within the window. Upon insertion of the interactive visual advertisement including the mask and the digital advertisement at the visual element loaded in a webpage of a computing device associated with a user, the visual element can: overlay the digital advertisement with the mask such that a first region of the digital advertisement exhibiting a first area is bounded by an aperture of the mask; and, in response to a first scroll event that moves the visual element from an initial location outside a window of the computing device to a first location within the window, render the mask over the digital advertisement such that a user viewing the interactive visual advertisement may see the first region of the digital advertisement bounded by the aperture. Then, in response to a second scroll event that moves the visual element to a second location above the first location within the window, the visual element can: expand the aperture according to a first transformation, in the sequence of transformations, linked to the second location, such that a second region (e.g., including the first region) of the digital advertisement is bounded by the aperture, the second region exhibiting a second area greater than the first area. As the user continues scrolling and the visual element continues moving toward a top of the window, the visual element can continue expanding the aperture (e.g., until the complete digital advertisement is revealed) according to the sequence of transformations (e.g., a second transformation linked to a third location, a third transformation linked to a fourth location, etc.).

Thus, as the user scrolls down a webpage (e.g., a scroll-down event) and the visual element moves toward a top of the window, the visual element can transform the mask according to the sequence of transformations (or "first sequence of transformations") to enlarge the aperture and reveal the full digital advertisement responsive to user scrolls. Therefore, the visual element can transform the mask (e.g., by increasing a size of the aperture) as the user scrolls down the webpage to reduce an amount of the digital advertisement obscured by the mask. However, if the user begins to scroll back up the webpage such that the visual element moves toward a bottom of the window (e.g., a scroll-up event), the visual element can transform the mask according to a second sequence of transformations. The visual element can modify the mask according to the second sequence of transformations to reverse the first sequence of transformations, such that the aperture shrinks as the user scrolls up, each transformation in the second sequence equal and opposite a corresponding transformation in the first sequence, thereby increasing an amount of the digital advertisement obscured by the mask. Alternatively, the visual element can maintain rendering of the "complete" digital advertisement in the visual element once the first sequence of transformations is complete, such that a user may continue viewing a full version of a static or video advertisement or click on a call-to-action rendered adjacent the digital advertisement.

In the preceding example, the visual element can transform the mask (e.g., according to the sequence of transformations) at a rate proportional to a scroll rate of the scroll event (e.g., a scroll-down event, a scroll-up event). For example, in response to a first scroll-event that moves the visual element from an initial position outside the window to a first position within the window, the visual element can: render the digital advertisement within the visual element; and render the mask over the digital advertisement, the mask revealing a first region of the digital advertisement. Then, in response to a first scroll-down event that moves the visual element to a second position above the first position within the window, the visual element can transform the mask according to a first sequence of transformations (e.g., defined by the mask) at a first rate proportional to a first scroll rate of the first scroll-down event, the first sequence of transformations modifying the mask to reveal a sequence of regions of the digital advertisement and corresponding to a sequence of vertical positions of the visual element within the window. Then, in response to a first scroll-up event that moves the visual element to a third position below the second position within the window, the visual element can transform the mask according to a second sequence of transformations—such as opposite the first sequence of transformations—at a second rate proportional to a second scroll rate of the first scroll-up event.

In another example, the mask can define a responsive transformation defining a sequence of transformations, each transformation in the sequence of transformations reducing an opacity of the base layer of the mask, such that the mask or base layer appears to "dissolve" responsive to the user scrolling up within the webpage. In this example, in response to a first scroll event that moves the visual element from an initial location outside a window of the computing device to a first location within the window, the visual element can render the mask over the digital advertisement, the base layer of the mask exhibiting a first opacity (e.g., 100%), such that a user viewing the interactive visual advertisement may only view the first region of the digital advertisement bounded by the aperture. Then, in response to a second scroll event that moves the visual element to a second location above the first location within the window, the visual element can: modify the base layer according to a first transformation, in the sequence of transformations, linked to the second location, by decreasing the first opacity (e.g., 100%) of the base layer to a second opacity (e.g., 90%). As the user continues scrolling down and the visual element continues moving toward a top of the window, the visual element can continue reducing the opacity of the base layer (e.g., until the complete digital advertisement is revealed) according to the sequence of transformations.

In another example, as shown in FIGS. 3A and 3B, the mask can define a responsive transformation defining a sequence of transformations, each transformation in the sequence of transformations animating (e.g., moving, reconfiguring a shape) the aperture, such as an aperture in the shape of car "driving" across the mask. In this example, in response to a first scroll event that moves the visual element from an initial location outside a window of the computing device to a first location within the window, the visual element can render the mask over the digital advertisement, the aperture arranged in a first position on the mask. Then, in response to a second scroll event that moves the visual element to a second location above the first location within the window, the visual element can: modify the aperture according to a first transformation, in the sequence of transformations, linked to the second location, by shifting the aperture from the first position toward a second position on the mask. As the user continues scrolling down and the visual element continues moving toward a top of the window, the visual element can continue shifting positions of the aperture on the mask according to the sequence of transformations.

Additionally and/or alternatively, in the preceding example, as the user continues scrolling down and the visual element continues moving toward the top of the window, the visual element can expand the aperture to reveal a greater portion of the digital advertisement beneath the mask. In one example, the visual element can be configured to: shift a position of the aperture on the mask and over the digital advertisement responsive to a first scroll event that moves the visual element from the first position to the second position within the window; and expand a size of the aperture within the mask responsive to a second scroll event that moves the visual element from the second position to a third position within the window above the second position. Alternatively, in another example, in response to a first scroll event that moves the visual element from the first position to the second position within the window, the mask can be configured to: shift a position of the aperture on the mask and over the digital advertisement; and expand a size of the aperture within the mask concurrently. Then, in response to a second scroll event that moves the visual element from the second position to the third position within the window, the visual element can be configured to continue to shift the position of the aperture on the mask over the digital advertisement and further expand the size of the aperture within the mask.

Additionally and/or alternatively, in this implementation, the mask can define a responsive transformation defining: a sequence of transformations linked to a sequence of (vertical) positions of the visual element within a window of a computing device; and a threshold duration for completion of the sequence of transformations. In this implementation, in response to the visual element remaining within the window for a duration exceeding the threshold duration, prior to modification of the mask according to the sequence of transformation, the visual element can automatically transform the mask according the sequence of transformations, such as at a preset rate (or "preset transformation rate"). For example, in response to an event (e.g., a scroll event, a click event) that locates the visual element at a first position within the window, the visual element can: render the digital advertisement within the visual element; render the mask over the digital advertisement, the mask revealing a first region of the digital advertisement; and initiate a timer. Then, in response to a scroll-down event that moves the visual element from the first position to a second position above the first position within the window, the visual element can transform the mask according to the sequence of transformations at a first rate proportional to a scroll rate of the scroll-down event, the sequence of transformations modifying the mask to reveal a sequence of regions of the digital advertisement and corresponding to a sequence of vertical positions of the visual element within the window. Alternatively, in response to expiration of the timer prior to a scroll-event, the visual element can transform the mask according to the sequence of transformations at a preset rate.

However, the mask can define a responsive transformation of any other type responsive to any other user input or interaction (e.g., scroll, click, swipe, tilt, gesture) and can contain any other visual content in any other format.

6.4 Call to Action

In one variation, the remote computer system can package the interactive visual advertisement with a call-to-action (or "CTA"), such as a textual statement or icon configured to persuade a user to perform a particular task, such as purchasing a product, signing up for a newsletter, or clicking-through to a landing page for a brand or product. Once packaged into the interactive visual advertisement, the visual element can animate the mask and digital advertisement to reveal the CTA (e.g., as a banner, as a clickable icon) responsive to user interactions with the visual element. For example, the remote computer system can package a video advertisement and a mask into an interactive visual advertisement. The remote computer system can further package this interactive visual advertisement with a CTA inserted beneath the mask and the video advertisement and along a bottom edge of the video advertisement. Then, upon insertion of the interactive visual advertisement into a visual element, the visual element can animate a bottom portion of the mask and the video advertisement to reveal the CTA along the bottom edge of the video advertisement.

The mask can define a responsive transformation including instructions for transforming the mask responsive to user scrolling. This responsive animation can include instructions for revealing the call to action within the visual element responsive to user scrolling within a webpage (or native application). In one implementation, the mask defines a responsive animation configured to reveal the CTA within the visual element responsive to a scroll event that locates the visual element at (or above) a particular location within the window.

For example, the remote computer system can: package a video advertisement exhibiting content related to a real-estate agency with a mask defining a responsive transformation including a CTA banner reading, "Find your next home today!" Upon insertion of the resulting interactive visual advertisement at an advertisement slot on a webpage rendered on a display of a computing device, the visual element can transform the mask according to the responsive transformation to render the CTA within the visual element responsive to user scroll events within the webpage. In particular, the visual element can: at a first time, render the interactive visual advertisement within the visual element absent the CTA banner responsive to a first scroll event that moves the visual element from an initial location outside a window of the display to a first location within the window; and, at a second time, render the CTA banner over a bottom border of the interactive visual advertisement responsive to a second scroll event that moves the visual element from the first location to a second location within the window above the first location.

The remote computer system can also assign a link associated with the digital advertisement (e.g., a link to a website for a product, retailer, or brand associated with the digital advertisement) to the CTA beneath the mask. Thus, when the CTA is revealed within the visual element, the user may enter an input (e.g., click, swipe) over the CTA and be routed to (e.g., in a new window) the link associated with the digital advertisement.

2. Engagement

The visual element (or advertisement platform) can also track user interactions with content (e.g., the digital advertisement, the mask) contained in the interactive visual advertisement. Further, the visual element (or advertisement platform) can leverage these user interactions to estimate engagement scores representing the degree and/or types (e.g., the nature) of these interactions. In particular, the visual element can collect data related to interactions between the interactive visual advertisement and a user viewing the interactive visual advertisement on a computing device and package these interaction data into one or more engagement scores indicative of user engagement with the interactive visual advertisement.

In one implementation, the visual element: tracks when the advertisement content is loaded onto the page; tracks a duration that the interaction visual advertisement is rendered on the display of the computing device; tracks a duration of playback of a video advertisement loaded in the visual element; tracks a duration of time the user spent interacting with the interactive visual advertisement; tracks a quantity of replays of a video advertisement loaded in the visual element; tracks a proportion of a digital advertisement (e.g., a proportion of a frame or frames) visible to the user; tracks a quantity of vertical scroll events (e.g., scroll-down events and scroll-up events) over the visual element; tracks a quantity of lateral scroll (or swipe) events over the visual element; tracks a quantity of clicks over the interactive visual advertisement; tracks whether the user selects the interactive visual advertisement to visit an external webpage related to the interactive visual advertisement; etc. The visual element can then estimate an engagement score that is proportional to each of these tracked interaction data or metrics.

In one implementation, the visual element can characterize the user's engagement with the interactive visual advertisement by characterizing the user's engagement with the digital advertisement and the user's engagement with the mask individually. Thus, the visual element can: track a first type of user interactions corresponding to interactions with the digital advertisement; and track a second type of user interactions corresponding to interactions with the mask overlaid the digital advertisement. The visual element (or advertisement platform) can then leverage this information to inform selection of future interactive visual advertisements served to this user and/or to update the interactive visual advertisement in real-time to increase user engagement with the interactive visual advertisement.

For example, for an interactive visual advertisement—including a video advertisement and a mask overlaid the video advertisement—loaded in a visual element located on a webpage rendered by a computing device accessed by a user, the visual element can: track a duration of the video advertisement viewed by the user; track an average proportion of frames of the video advertisement visible to the user; and estimate a first engagement score for the user interacting with the video advertisement based on the duration and the average proportion. The visual element can also: track a quantity of vertical scroll inputs entered by the user over the interactive visual advertisement (e.g., to animate the mask); and estimate a second engagement score for the user interacting with the mask based on this quantity. The visual element can then return these engagement scores to the advertisement platform.

Further, by generating separate engagement scores for the both the user interacting with the digital advertisement and the user interacting with the mask, the visual element and/or advertisement platform can leverage these engagement scores to adjust the interactive visual advertisement in real-time to increase user engagement with the interactive visual advertisement and/or inform selection of future interactive visual advertisements to serve to this user.

For example, if the first engagement score for the digital advertisement is relatively high and the second engagement score for the mask is relatively low—indicating the user is highly engaged with the digital advertisement but less engaged with the mask—the visual element can update the mask in real-time to increase engagement of the user with the mask, such as by: automatically animating the mask within the visual element regardless of scrolls entered by the user; adjusting a color scheme of the mask to draw the user's attention to the mask; and/or replacing the mask with a new mask in the visual element with which the user may be more likely to engage. Alternatively, in this example, the visual element can remove the mask entirely such that the user can further engage with the digital advertisement, which may increase a likelihood of the user clicking on the digital advertisement and/or completing a purchase of a product related to the digital advertisement. In particular, in this example, if the user views more than a threshold duration of a video advertisement or if the user views more than a threshold quantity of replays of the video advertisement, the visual element can remove the mask entirely such that the user may view an entire area of frames of the video advertisement.

Additionally and/or alternatively, the visual element and/or advertisement platform can leverage the first and second engagement scores to selectively serve a next interactive visual advertisement to this user, such as by serving the user a next interactive visual advertisement including the same digital advertisement and a new mask.

Alternatively, in another example, if the first engagement score is relatively low and the second engagement score is relatively high—indicating the user is highly engaged with the mask but less engaged with the digital advertisement (e.g., the user watched less than a threshold proportion of the video advertisement scrolling back up with the webpage)—the visual element can update the interactive visual advertisement in real-time to increase engagement of the user with the digital advertisement, such as by: increasing a size of an aperture included in the mask to obscure less of the digital advertisement; and/or replacing the video advertisement with a new (related) digital advertisement. Additionally and/or alternatively, the visual element and/or advertisement platform can leverage the first and second engagement scores to selectively serve a next interactive visual advertisement to this user, such as by serving the user a next interactive visual advertisement including the same mask and a new interactive visual advertisement or including a new mask defining the same animation type or silhouette and a new interactive visual advertisement.

The visual element can thus generate multiple unique engagement scores for various interactions between the user and the visual element, interactive visual advertisement, digital advertisement, mask, call-to-action, selectable icons, and/or any other links within the interactive visual advertisement. Additionally and/or alternatively, the visual element can aggregate these engagement scores into a composite (or total) engagement score representing the user's overall engagement with the interactive visual advertisement. The visual element can then return these unique engagement scores and/or the composite engagement score to the advertisement platform. However, the visual element can track user interactions with content in the interactive visual advertisement and transform these interaction data into one or more engagement scores according to any other method or schema.

8. Serving Interactive Visual Advertisements

The remote computer system can access a digital advertisement from an internal or external database (e.g., a server or local file storage, such as browser client), such as over the Internet for loading into a visual element inserted (or configured for insertion) into an electronic document rendered within a window by a computing device. The digital advertisement can include a static digital advertisement or a digital video, such as in MP3, MP4, MOV, WEBM or AVI formats and can span a particular duration (e.g., 15 seconds, 30 seconds, 1 minute). The remote computer system can load this digital advertisement into a visual element that is later inserted inline within a document (e.g., a webpage or mobile application) and overlay the digital advertisement with a mask configured to obscure portions of frames in the digital advertisement. The remote computer system can then: publish this interactive visual advertisement for download and/or distribution by the advertiser; or upload the interactive visual advertisement to an advertisement exchange, to a publisher advertisement server, to an advertising agency advertisement server, or to another content distribution network for subsequent distribution to users.

Later, when a user navigates to a publisher's webpage via a web browser or to a mobile application via a native application (hereinafter an "app") executing on her smartphone, tablet, or other computing device, a web server hosted by the publisher can return content or pointers to content for the webpage (e.g., in Hypertext Markup Language, or "HTML", or a compiled instance of a code language native to a mobile operating system), including formatting for this content and a publisher advertisement tag that points the web browser or app to the publisher's advertisement server (e.g., a network of external cloud servers). The advertisement server can then implement an advertisement selector to select a particular advertisement to serve to the web browser or app and either: return the selected advertisement directly to the web browser or app; or return a second advertisement tag that redirects the browser or app to an advertiser or publisher's advertisement server. In the latter case, the advertiser or publisher advertisement server can return a third advertisement tag that redirects the web browser or app to a content delivery network, which may include a network of cloud servers storing raw creative graphics for the ad, and the content delivery network can return the selected advertisement to the web browser.

In the foregoing implementation, if the advertisement server selects the interactive visual ad, the advertisement server or content delivery network, etc. can return the short and the visual element package in the form of content within an HTML iframe element to the web browser or content within a view on the mobile application which can then place the iframe element within the webpage or within the window of the app.

9. Variation: Automatic Responsive Transformation

In one variation, the mask can define a responsive transformation configured to trigger automatic modification of the mask. In this variation, upon insertion of an interactive visual advertisement, including a digital advertisement and the mask overlaid the digital advertisement, into a visual element, the visual element can modify (or reconfigure) the mask according to a sequence of transformations, defined by the responsive transformation, such as at a preset transformation rate. In this variation, the mask can define a responsive transformation configured to reveal portions of the digital advertisement as described above, such as by: adjusting an opacity of the base layer and/or set of apertures within the mask; expanding (or shrinking) the set of apertures; animating the set of apertures; or any other type of transformation.

In one implementation, the mask can define a time-based responsive animation. In this implementation, the visual element can automatically modify (or reconfigure) the mask according to the time-based responsive animation in response to the visual element remaining within the window for more than a threshold duration (e.g., one second, five seconds, thirty seconds).

For example, the mask can define a responsive transformation defining a sequence of transformations and defining a threshold duration. In this example, at a first time, in response to an event that locates a minimum proportion (e.g., ten percent, fifty percent, one-hundred percent) of the visual element—loaded with an interactive visual advertisement including the mask overlaid a digital advertisement—within a window (e.g., a viewing window) of a computing device (e.g., a smart TV, a tablet, a mobile phone) accessed by a user, the visual element can: record an initial time value corresponding to the first time; render the digital advertisement within the visual element; render the mask over the digital advertisement in an initial configuration, the mask revealing a first region of the digital advertisement (e.g., revealing a portion of the digital advertisement).

Then, at a second time succeeding the first time (e.g., by a set time interval), during rendering of the digital advertisement and the mask over the digital advertisement in the initial configuration, the visual element can: access a second time value corresponding to the second time; and calculate a duration between the first time value and the second time value. Then, in response to the duration exceeding the threshold duration, defined by the responsive transformation, the visual element can transform the mask according to the sequence of transformations, such as at a preset transformation rate. Additionally, in response to transforming the mask according to a final transformation, in the sequence of transformations, the visual element can: render the digital advertisement within the visual element; render the mask over the digital advertisement in a final configuration, the mask revealing a second region of the digital advertisement (e.g., revealing a full view of the digital advertisement).

Alternatively, in response to the first duration falling below the threshold duration, the visual element can continue rendering the digital advertisement and the mask over the digital advertisement in the initial configuration until the duration between the initial time value and a next time value exceeds the threshold duration. For example, the visual element can access and/or record time values on a regular interval (e.g., a 200-millisecond interval).

Additionally and/or alternatively, in the preceding example, in response to rendering the digital advertisement and the mask over the digital advertisement in the final configuration within the visual element for more than a second threshold duration (e.g., less than one second, five seconds, thirty seconds), the visual element can: transform the mask according to a second sequence of transformation opposite the sequence of transformations; render the mask over the digital advertisement in the first configuration, within the visual element, to initialize the interactive visual advertisement; or render a static image, a call-to-action, and/or a selectable icon in replacement of the digital advertisement within the visual element.

Additionally and/or alternatively, in another implementation, the mask can define a responsive transformation that is both time-based and responsive to user inputs, such as responsive to a click, hover (e.g., a user locating her cursor or pointer over the interactive visual advertisement), scroll, swipe, or tilt event at the computing device (e.g., Smart TV, desktop computer, mobile phone) accessed by the user.

For example, the mask can define a responsive transformation defining a sequence of transformations and defining a threshold duration. In this example, in response to an event that locates the visual element, loaded with an interactive visual advertisement including the mask overlaid a digital advertisement, the visual element can: render the digital advertisement within the visual element; render the mask over the digital advertisement within the visual element, the mask revealing a first region of the digital advertisement; and initiate a timer for the threshold duration. Then, in response to expiration of the timer, the visual element can transform the mask according to the sequence of transformations at a preset transformation rate, the sequence of transformations modifying the mask to reveal a sequence of regions of the digital advertisement. Alternatively, in response to a user input (e.g., a selection or click, locating a pointer, a scroll or swipe event) over the visual element prior to expiration of the timer, the visual element can transform the mask according to the sequence of transformations at the preset transformation rate. Therefore, in this example, the visual element enables the user to engage with the interactive visual advertisement prior to automatic modification (or transformation) of the mask.

In another implementation, the mask can define a position-based responsive animation configured to trigger automatic modification of the mask in response to an event that moves the visual element to a target location within the window.

For example, the mask can define a responsive transformation defining a sequence of transformations and defining a target position (e.g., a center position in the window, a position at which 100 percent of the visual element is located within the window, within a particular region of the window). In response to a first event—such as an event initiated by the user (e.g., a scroll event, a click event, a tilt event, a gesture event, a swipe event, or a pause event) or an event automatically triggered by a native application executing on the user's computing device (e.g., a mobile phone, a tablet, a smart TV, a video game system)—that locates the visual element (e.g., a portion or all of the visual element) in view within the window of the computing device, the visual element can: render the digital advertisement; and render the mask over the digital advertisement, the mask revealing a first region of the digital advertisement. Then, in response to a second event that locates the visual element within a threshold deviation of the target position within the window, the visual element can transform the mask according to the responsive animation at a preset transformation rate, the sequence of transformations modifying the mask to reveal a sequence of regions of the digital advertisement.

Therefore, in this implementation, by modifying the mask at the preset transformation rate once the visual element is located proximal a target position or within a particular region within the window, the visual element can increase visibility of the interactive visual advertisement—and in particular the responsive transformation of the mask—within the window, thereby increasing a likelihood of the user engaging with (e.g., viewing, selecting) the interactive visual advertisement.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising, at an image player inserted within an electronic document rendered within a window of a computing device:
    loading an interactive digital media into the image player, the interactive digital media comprising:
        a digital media comprising visual media content distinct from the electronic document; and
        a mask configured to obscure the digital media and comprising:
            an aperture:
                defining an outline associated with the digital media; and
                configured to reveal a proportion of the digital media linked to a vertical position of the image player within the window;
    in response to a first event that locates the image player at a first vertical position within the window, rendering the digital media within the image player and rendering the mask over the digital media to reveal a first proportion of the digital media;
    in response to a first scroll-down event that moves the image player from the first vertical position toward a second vertical position above the first vertical position within the window at a scroll rate,
        transforming the aperture at a rate corresponding to the scroll rate to reveal an increasing proportion of the digital media.

2. The method of claim 1, wherein loading the interactive digital media comprising the mask comprises loading the interactive digital media comprising the mask comprising the aperture defining the outline of an icon associated with the digital media.

3. The method of claim 1, wherein transforming the aperture to reveal the increasing proportion of the digital media comprises:
    expanding the aperture within the mask to reveal a sequence of regions of the digital media, each subsequent region, in the sequence of regions, spanning a greater proportion of the digital media than each preceding region in the sequence of regions.

4. The method of claim 1, further comprising, in response to a first scroll-up event that moves the image player toward a third vertical position below the second vertical position within the window, transforming the aperture to obscure a decreasing proportion of the digital media.

5. The method of claim 1:
    wherein loading the interactive digital media comprising the interactive digital media comprises loading the interactive digital media comprising a video;
    wherein rendering the interactive digital media within the image player comprises:
        rendering a first frame of the video within the image player; and
        initiating playback of the video within the image player;
    wherein rendering the mask over the digital media comprises rendering the mask over frames of the video within the image player; and
    wherein transforming the aperture comprises transforming the aperture during playback of the video within the image player.

6. The method of claim 5, further comprising, in response to rendering a final frame of the video within the image player, rendering a static frame comprising a call-to-action related to the video within the image player.

7. The method of claim 1, wherein loading the interactive digital media in the image player comprises:
    receiving identification of the digital media selected for presentation within the image player;
    selecting the mask, from a set of masks, based on characteristics of the digital media;
    overlaying the mask over the digital media to generate the interactive digital media; and
    inserting the interactive digital media into the image player.

8. The method of claim 1:
    wherein loading the interactive digital media into the image player comprises loading the interactive digital media into the image player, the interactive digital media comprising the mask comprising:
        a base layer configured to obscure the digital media and defining a first opacity; and
        the aperture defining a second opacity less than the first opacity; and
    wherein transforming the aperture to reveal the increasing proportion of the digital media comprises reducing the first opacity of the base layer at a first rate proportional the scroll rate of the first scroll-down event, the base layer defining a third opacity less than the second opacity at the second vertical position.

9. The method of claim 1, further comprising, characterizing engagement of the user with the interactive digital media based on a quantity of scroll events over the interactive digital media while the image player is rendered within the window.

10. A method comprising, at an image player inserted within an electronic document rendered within a window of a computing device:
    loading an interactive digital media into the image player, the interactive digital media comprising:
        a video comprising content distinct from the electronic document; and
        a mask comprising:
            a base layer configured to obscure the video; and
            a set of apertures:
                configured to reveal regions of the video; and
                defining an outline associated with the video;

in response to an initial scroll event that moves the image player to a first position within the window:
rendering the video within the image player; and
rendering the mask over the video, the set of apertures revealing a first region of the video; and
in response to a first scroll event that moves the image player over a sequence of positions within the window at a first scroll rate, expanding the set of apertures at a first rate corresponding to the first scroll rate to reveal a sequence of regions of the video corresponding to the sequence of positions of the image player.

11. The method of claim 10:
wherein rendering the mask over the video comprises rendering the mask over the video, the mask defining a first set of locations of the set of apertures over the video; and
wherein expanding the set of apertures further comprises relocating the set of apertures from the first set of locations over a sequence of locations over the video, the sequence of locations corresponding to the sequence of positions of the interactive digital media within the window.

12. The method of claim 10, further comprising:
characterizing engagement of a user, accessing the computing device, with the interactive digital media based on a quantity of scroll events over the interactive digital media while the image player is rendered within the window; and
characterizing engagement of the user with the interactive digital media based on a proportion of the video viewed by the user during playback of the video.

13. A method comprising, at an image player inserted within an electronic document rendered within a window of a computing device accessed by a user:
loading an interactive digital media into the image player, the interactive digital media comprising:
a digital media comprising content distinct from content of the electronic document; and
a mask:
configured to obscure regions of the digital media; and
defining a set of apertures:
defining an outline associated with the digital media; and
configured to reveal regions of the digital media;
in response to an initial event that locates the image player at a first vertical position within the window, rendering the digital media within the image player and rendering the mask over the digital media to reveal a first proportion of the digital media; and
in response to a first scroll-down event moving the image player from the first vertical position toward a second vertical position above the first vertical position within the window at a scroll rate, transforming the mask at a rate corresponding to the scroll rate to obscure a decreasing proportion of the digital media.

14. The method of claim 13:
wherein loading the interactive digital media comprising the digital media and the mask comprises loading the interactive digital media comprising the digital media and the mask comprising:
a base layer defining a first opacity; and
the set of apertures defining a second opacity less than the first opacity; and
wherein transforming the mask to obscure the decreasing proportion of the digital media comprises:
expanding the set of apertures within the base layer to decrease the proportion of the digital media obscured by the base layer; and
rendering the digital media, obscured by the mask, within the image player during the first scroll-down event.

15. The method of claim 13, wherein transforming the mask to obscure the decreasing proportion of the digital media in response to the first scroll-down event moving the image player from the first vertical position toward the second vertical position comprises, in response to the first scroll-down event moving the image player over a sequence of vertical positions, from the first vertical position toward the second vertical position, transforming the mask to obscure the decreasing proportion of the digital media corresponding to the sequence of positions of the image player within the window.

16. The method of claim 13, further comprising:
characterizing a first engagement score for the user interacting with the interactive digital media based on user interactions with the mask; and
characterizing a second engagement score for the user interacting with the interactive digital media based on user interactions with the digital media.

17. The method of claim 16:
wherein characterizing the first engagement score based on user interactions with the mask comprises characterizing the first engagement score based on the first scroll-down event; and
wherein characterizing the second engagement score based on user interactions with the digital media comprises characterizing the second engagement score based on a total proportion of the digital media viewed by the user.

18. The method of claim 1, wherein transforming the aperture to reveal the increasing proportion of the digital advertisement comprises expanding the aperture to reveal the increasing proportion of the digital advertisement, the aperture revealing a second proportion, greater than the first proportion, of the digital media at the second vertical position.

19. The method of claim 4:
wherein transforming the aperture to reveal the increasing proportion of the digital media comprises expanding the aperture within the mask to reveal the increasing proportion of the digital media; and
wherein transforming the aperture to obscure the decreasing proportion of the digital media comprises contracting the aperture within the mask to reveal the decreasing proportion of the digital media.

20. The method of claim 13, further comprising, in response to a scroll-up event that moves the image player from the second vertical position toward a third vertical position below the second vertical position within the window, transforming the mask to obscure an increasing proportion of the digital media.

* * * * *